(12) United States Patent
Schultze et al.

(10) Patent No.: US 9,280,195 B2
(45) Date of Patent: Mar. 8, 2016

(54) METHOD FOR AUTOMATICALLY GENERATING USER PROGRAM CODE FOR A PROGRAMMABLE LOGIC CONTROLLER FOR CONTROLLING A MACHINE

(75) Inventors: Stephan Schultze, Lohr-Wombach (DE); Alexander Koehl, Lohr-Pflochsbach (DE)

(73) Assignee: Robert Bosch GmbH, Stuttgart, DE (US)

( * ) Notice: Subject to any disclaimer, the term of this patent is extended or adjusted under 35 U.S.C. 154(b) by 377 days.

(21) Appl. No.: 13/560,125

(22) Filed: Jul. 27, 2012

(65) Prior Publication Data

US 2013/0191669 A1    Jul. 25, 2013

(30) Foreign Application Priority Data

Jul. 29, 2011  (DE) .................. 10 2011 108 964

(51) Int. Cl.
*G06F 9/44*  (2006.01)
*G06F 1/32*  (2006.01)
*G05B 19/042*  (2006.01)

(52) U.S. Cl.
CPC .............. *G06F 1/32* (2013.01); *G05B 19/0426* (2013.01); *G06F 8/30* (2013.01); *G05B 2219/25281* (2013.01); *G05B 2219/25289* (2013.01); *G05B 2219/25291* (2013.01)

(58) Field of Classification Search
CPC ........... H05B 37/0272; H05B 37/0227; H05B 37/0281; H05B 37/02; H05B 33/0809; H05B 33/0854; H05B 37/0218; H05B 41/38; H05B 35/00; H05B 37/0245; H05B 37/0254; G06F 1/32; G06F 8/30
USPC ......................................... 717/106, 107, 120
See application file for complete search history.

(56) References Cited

U.S. PATENT DOCUMENTS

| | | | |
|---|---|---|---|
| 3,942,158 A * | 3/1976 | Dummermuth ................. 710/19 |
| 8,362,655 B2 * | 1/2013 | Landgraf et al. .............. 307/116 |
| 8,532,827 B2 * | 9/2013 | Stefanski et al. ............. 700/276 |
| 2007/0176490 A1 * | 8/2007 | He et al. ...................... 307/10.1 |
| 2008/0148222 A1 * | 6/2008 | Pao ............................. 717/106 |
| 2009/0017173 A1 * | 1/2009 | Kozman et al. ............... 426/233 |
| 2011/0048245 A1 * | 3/2011 | Schjerven et al. ............. 99/331 |
| 2011/0269085 A1 * | 11/2011 | Wiker et al. ..................... 432/4 |

\* cited by examiner

*Primary Examiner* — Anna Deng
(74) *Attorney, Agent, or Firm* — Maginot, Moore & Beck LLP

(57) ABSTRACT

A method for automatically generating user program code for a programmable logic controller configured to control a machine, includes providing, at a first earlier time, a plurality of selectable program code parts for the programmable logic controller; and automatically generating the user program code at, a second later time, by combining at least two of the plurality of selectable program code parts that have been selected by a user. At least one of the plurality of selectable program code parts is configured to activate at least one energy-saving function of an energy consumer of the machine. The at least one energy-saving function has energy-saving function properties.

13 Claims, 2 Drawing Sheets

METHOD FOR AUTOMATICALLY GENERATING USER PROGRAM CODE FOR A PROGRAMMABLE LOGIC CONTROLLER FOR CONTROLLING A MACHINE

This application claims priority under 35 U.S.C. §119 to patent application no. DE 10 2011 108 964.4, filed on Jul. 29, 2011 in Germany, the disclosure of which is incorporated herein by reference in its entirety.

The present disclosure relates to a method for automatically generating user program code for a programmable logic controller for controlling a machine.

BACKGROUND

A programmable logic controller (PLC) is a device which is used to control or regulate a machine or installation and is digitally programmed.

In the simplest case, a PLC has inputs, outputs, an operating system (firmware) and an interface which can be used to load the user program. The user program defines how the outputs are intended to be switched on the basis of the inputs. Drive control (motion control, speed control with controlled acceleration or deceleration) is also implemented using PLCs.

The operating system (firmware) ensures that the current state of the transducers is always available to the user program. The user program can use this information to switch the outputs in such a manner that the machine or installation operates in the desired manner.

The PLC is connected to the machine or installation using sensors and actuators. The sensors are connected to the inputs of the PLC and communicate the events in the machine or installation to the PLC. Examples of sensors are, for example, light barriers, incremental encoders, limit switches or else temperature sensors, level sensors etc. The actuators are connected to the outputs of the PLC and make it possible to control the machine or installation. Examples of actuators are contactors for switching on electric motors, electric valves for hydraulics or compressed air.

The sensors and actuators are increasingly being connected to the PLC via a field bus and no longer in a discrete manner. This reduces the wiring complexity. Not only sensors and actuators but parts of the PLC, such as input and output subassemblies, have also been connected to a central station for some time via a bus and (bus) interface modules (decentralized peripherals). In modern installations, the bus systems are removed from networks (for example SERCOS III, ProfiNet) or are supplemented with the latter. Networks (Ethernet) are more flexible and faster than bus systems.

When automating machines and installations, the aspect of effective engineering is becoming increasingly important in addition to the functionalities provided by an automation solution. This involves, in particular, clearly mapping an application with efficient program code in a short time. There are peculiarities, in particular, when automating motion applications in which an essential part involves moving shafts in a coordinated manner. Therefore, the machine manufacturers have developed programming tools in order to simplify the generation of user program code for PLCs. Programming is usually effected using corresponding software on a programming device (for example an application in Microsoft Windows or Linux on a PC or a tailored system).

The programming tools already contain programming templates with predefined program code in order to easily implement fundamental machine sequences, for example error detection and response, or typical machine operating modes such as "initialization", "automatic" for the production mode and "manual" for manually moving the drives. Against this background, the applicant, for example, provides, as a programming template, the so-called generic application template (GAT) which makes it possible to easily and quickly develop clear logic applications. Peculiarities of motion applications are taken into account. On the basis of a program framework according to IEC61131-3, said template makes it possible to easily and quickly develop applications together with a dialog-based wizard. It also supports the peculiarities of motion applications, for example the handling of shafts. Programming templates provide, for example, predefined state machines and interfaces for adapting the state machines. The programming template usually has the GAT wizard elements in the programming interface, state machine or machine modules as a PLC user program and visualization elements.

The GAT wizard is used to configure the programming template under dialog control. These dialogs are used, for example, to manage operating modes and states, machine modules, shafts and visualizations. In this case, the state machine is constructed (automatically generated) in the background as a PLC user program. The user must then still program the function of the machine in the different states. Using the wizard, the user can jump, in a relatively simple manner, to the corresponding location in the PLC programming system in order to insert PLC user program code there. The automatically generated PLC user program is a program framework within which the user programs the states or state transitions, for example. As a result of the structure being displayed in the GAT wizard, the programmer always keeps an overview. This simplifies the so-called top-down program development for the user.

This automatic program generation is intended to be improved with regard to the energy consumption of the controlled machine. In particular, idling phases are scarcely taken into account in many PLC user programs, with the result that there is a need for improvement here.

SUMMARY

The disclosure proposes a method for automatically generating user program code for a programmable logic controller for controlling a machine. A computation unit according to the disclosure, for example a programming device for a PLC (a so-called PLC user programming device), is set up, in particular in terms of programming, to carry out a method according to the disclosure.

The disclosure presents a possible way of taking into account energy-saving functions of the controlled machine when automatically generating PLC user program code. It was estimated that the average idling losses in production technology can be reduced by approximately 20% by using energy-saving states.

In the context of this disclosure, the term "energy-saving function" is used as a generic term which comprises any operating mode and functionality of the machine which is specifically designed for a low energy consumption. In particular, said term comprises energy-saving modes, for example standby, quiescent state etc. An energy consumer may provide one or more energy-saving functions. Any controllable element of the machine, in particular actuators and sensors themselves as well as the components controlled by the actuators, such as motors, power supply units etc., is referred to as an "energy consumer".

The disclosure is preferably implemented in the form of software. This results in particularly low costs, in particular when an executing computation unit is also used for other tasks and is therefore present anyway. Suitable data storage media for providing the software are, in particular, floppy disks, hard disks, flash memories, EEPROMs, CD-ROMs, DVDs etc. It is also possible to download the software via computer networks (Internet, intranet etc.). In particular, protection is sought for any product which is suitable for carrying out a method according to the disclosure and, in particular, for programmed implementation of the disclosure in all its manifestations, be it as a computer program which is provided via a computer network and is stored at this time on a server memory, be it as a programmed method instruction stored on a computer-readable medium.

The disclosure assists the programmer when creating programs by predefining program code parts for energy-saving functions and providing them in the programming template (for example in the GAT wizard). It is appropriate to provide the program code parts in a programming operating mode. In addition to "initialization", "automatic", "manual" etc. operating modes which can already be selected, there is then the "energy-saving" operating mode, for example.

Recently, energy-saving functions (for example energy-saving modes) are increasingly being provided in machines in order to thus be able to reduce the energy consumed by the machine, in particular during idling. However, programming templates according to the current prior art do not take into account the management of energy-saving functions of the connected energy consumers. As a result, the possible energy-saving functions of the connected energy consumers (machine and its parts) can only be used with additional knowledge in the field of energy management and additional programming effort. Furthermore, the programming template must conceptually allow the corresponding expansion, which cannot be presupposed in all cases. The present disclosure eliminates this problem by virtue of the energy-saving functions already being taken into account by the programming template and thus being provided as program code parts which must only be selected and thus activated by the programmer.

Different energy-saving states are advantageously supported as energy-saving functions within the programming template. In this case, typical energy-saving states of machines and machine parts are expediently predefined as program code parts and are offered for selection, for example a standby mode during production, a break mode (for example lunch break), a mode for maintaining machine parts. The states may optionally also be provided with times by means of an operator input in the wizard, for example a break time of a lunch break. This makes it possible to generate a PLC program code part which uses energy-saving attributes (for example a minimum break time, energy consumption of an energy mode etc.) to change the corresponding devices to the optimum energy-saving mode in each case. When carrying out the disclosure (for example during energy management of the programming template), the respective optimum energy-saving function is preferably selected on the basis of the information for each energy consumer in order to minimize the idling losses in the break times, for example. The user program code automatically generated by using the programming template then activates these functions during operation on the respective energy consumers.

Provision may also be advantageously made for the program code parts of the energy-saving functions to be provided with a corresponding lead time for their completion in order to continue the production mode "just in time". In this case, the PLC user program generated automatically terminates the energy-saving function so punctually that the production mode can be continued as planned. If, for example, a "morning break" state with the indication "break time 15 min" is used, where the break time was input within a dialog of the programming template, this break time can be concomitantly transferred in the PLC program call. In addition, there may also be energy-saving functions with an unknown duration which are then usually left by operating the machine.

The disclosure can be used in a particularly advantageous manner if at least one energy consumer connected to the PLC, for example a drive, supports functions for reducing the energy consumption, for example for idling, as defined, for example, by PROFIenergy or SERCOS Energy.

According to one preferred embodiment of the disclosure, PLC user program code for activating energy-saving functions having energy-saving function properties which are known at the programming time is automatically generated. An energy-saving function property is, in particular, a power consumption in the energy-saving state, a time needed to restore the production mode, an energy consumption for restoring the production mode, an average power consumption in the production mode and/or further properties, as specified, for example, in PROFIenergy or SERCOS energy. The PLC user program is simplified since the energy-saving function properties are not read at the runtime of the PLC user program but rather are already known at the time at which the PLC user program is compiled.

According to another preferred embodiment of the disclosure, the use of energy-saving function properties from device library data or files is advantageous. In this refinement, energy-saving function properties are read into the programming system via device descriptions. That is to say, a device need not necessarily have implemented an energy-saving profile.

According to another preferred embodiment of the disclosure, input means are provided, for example in the form of dialog inputs in the programming environment, in order to receive energy-saving function properties.

In this case, the properties are input by the user by means of a dialog. Provision may be additionally made for the energy-saving function properties to be adopted into a device library, with the result that they are also available in future without new user inputs.

According to another preferred embodiment of the disclosure, provision may be made for the PLC to be programmed to communicate with the PLC user programming device in such a manner that the energy-saving functions of consumers in the machine are made known to the PLC user programming device and thus to the programming template by the programming time. In this case, energy-saving function properties can be read out online from the devices supporting energy-saving functions (for example data relating to an energy-saving profile which are present in the device). It may be necessary for the devices to be connected and switched on at the programming time. In this case too, provision may be made for the data to be adopted into a device library, with the result that they are also available in future without connected devices.

According to another preferred embodiment of the disclosure, the user program is automatically generated in such a manner that it reads out energy-saving function properties from the machine or the energy consumers contained in the latter at the runtime of the PLC user program (that is to say during operation of the machine). Read-out is effected, in particular, in an initialization step during the runtime. If an energy consumer provides a plurality of energy-saving functions, the user program code can be automatically generated in such a manner that an energy-saving function is selected in such a manner that a predefinable condition is met. This may be, for example, a minimum maximum power consumption or a minimum average power consumption.

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

The disclosure is schematically illustrated in the drawing using an exemplary embodiment and is described in detail below with reference to the drawing.

DETAILED DESCRIPTION

Figure 1:
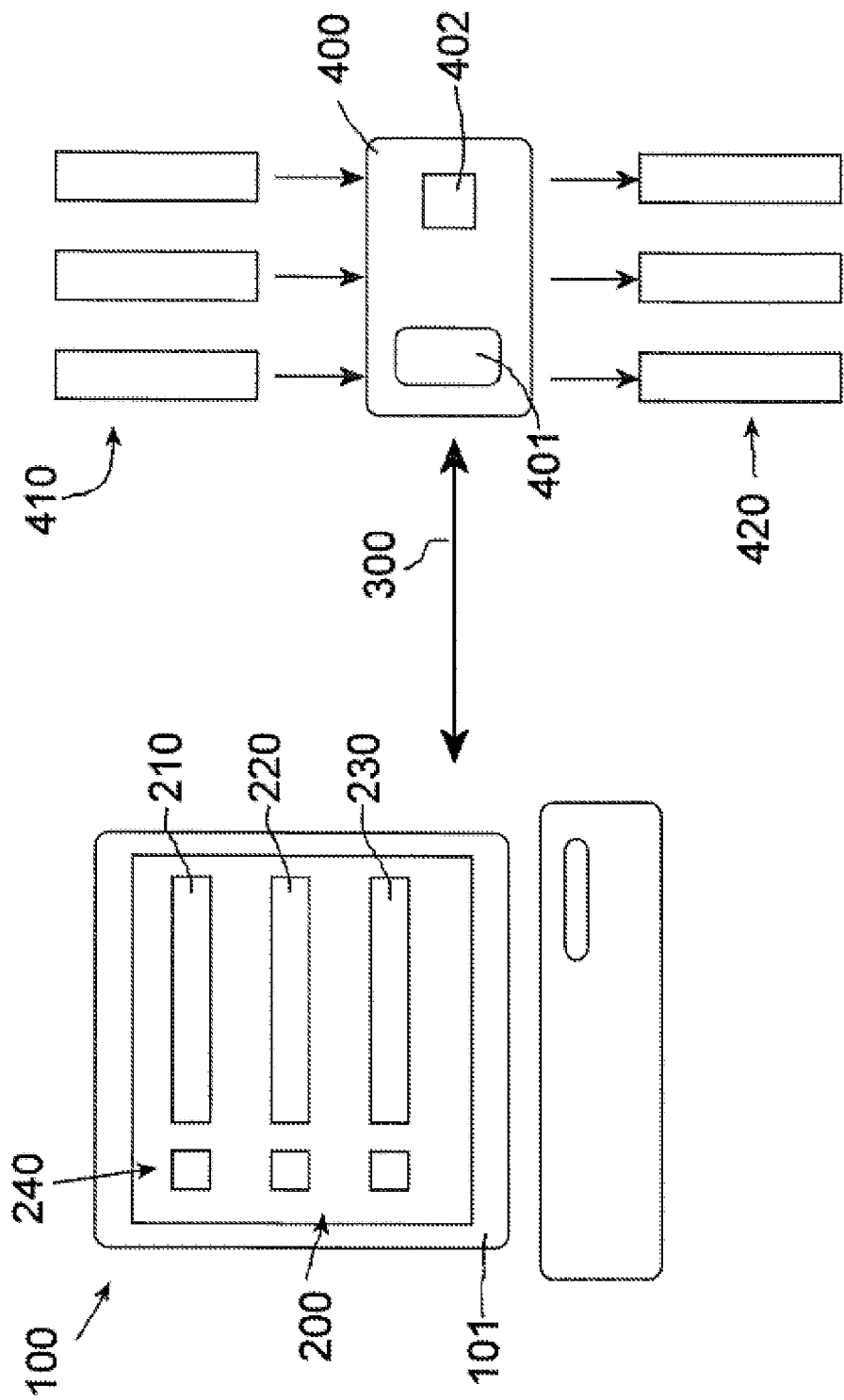
FIG. 1 shows, in a roughly schematic manner, a preferred embodiment of a computation unit according to the disclosure.
Figure 2:
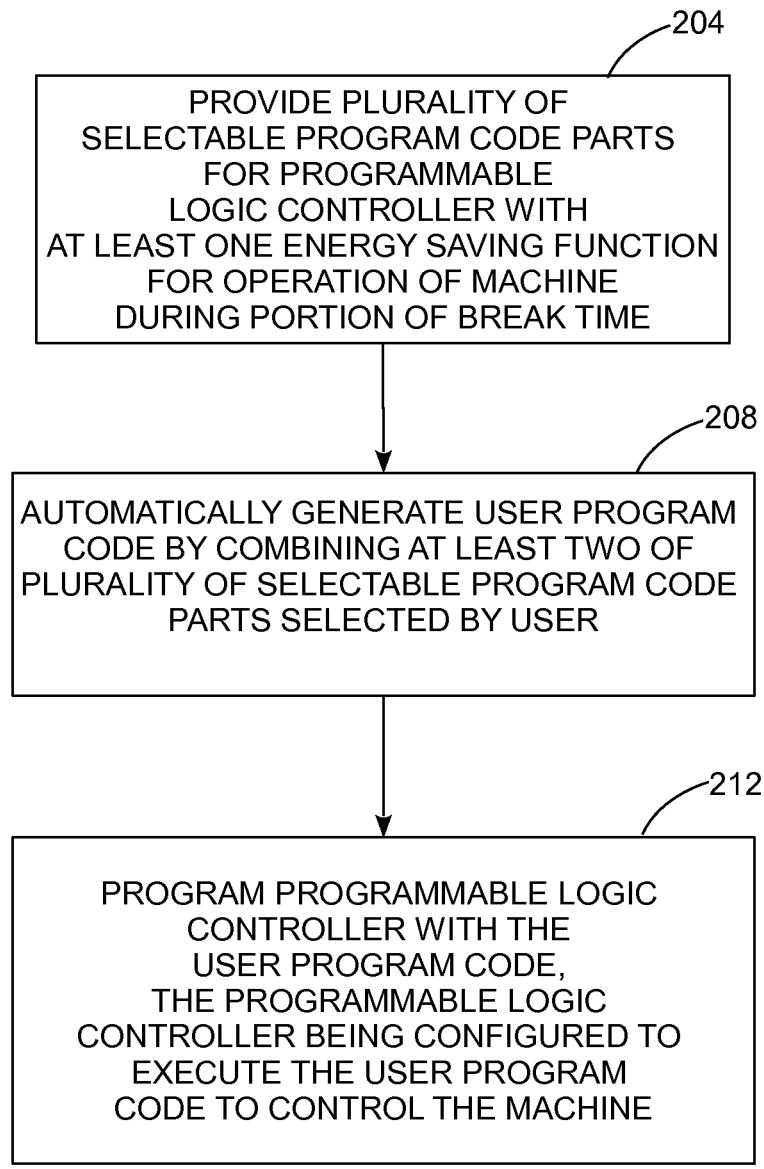
FIG. 2 is a block diagram of a method for automatically generating user program code for a programmable logic controller configured to control a machine.

FIG. 1 illustrates a preferred embodiment of a computation unit 100 according to the disclosure which is in the form of a PLC programming device and is set up, in terms of programming, to carry out a method, shown in FIG. 2, according to the disclosure. The computation unit 100 may be, for example, a conventional computer on which PLC programming software 200 is executed.

The disclosure relates to the operation of programming a PLC 400 by a user using the PLC programming device 100.

The PLC programming device 100 is connected to the PLC 400 to be programmed via a corresponding connection 300, for example an Ethernet connection or a serial connection. The PLC 400 at least has a storage device 401 for accommodating the generated PLC user program and a CPU 402 for executing the stored PLC user program. The PLC 400 is also connected to sensors 410 and actuators 420, for example by means of a field bus connection, in particular an Ethernet field bus connection, for example SERCOS III, in order to control a machine (not shown) according to the PLC user program. A sensor is, for example, a temperature sensor, a pressure sensor, a speed sensor, a position sensor etc. but also a switch, a rotary knob etc. and is intended to record input variables (for example temperature, pressure, speed, position, position of a switch or of a rotary knob). Output variables (for example temperature, pressure, speed, current intensity, voltage, injection quantity, position etc.) are calculated from said input variables by the PLC user program and are set using the actuators (for example electronic switch, relay, valve etc.). The sensors and actuators are usually part of the machine.

The programming device 100 is set up, in terms of programming, to automatically generate a PLC user program code, if appropriate taking into account user inputs (for example break times). For this purpose, a PLC programming template 200 is displayed to the user on a screen 101 of the programming device 100. Within the scope of the disclosure, program code parts 210, 220, 230 which are each set up to activate at least one energy-saving function of an energy consumer of the machine are predefined in the programming template 200. The program code parts 210 to 230 can be selected by the user, for example by marking selection fields 240 (block 204).

In the example shown, the program code part 210 is used to change the machine to a "break" energy-saving mode, the program code part 220 is used to change the machine to a "standby" energy-saving mode, and the program code part 230 is used to change the machine to a "maintenance" energy-saving mode.

For example, the program code part 210 is predefined in such a manner that it changes the machine to a "break" energy-saving mode and, for this purpose, switches off particular consumers (for example a motor), for example, by disconnecting the voltage supply via an associated switch as an actuator, for example. The user (operator of the PLC programming device) need not be concerned about the actuators to be actually controlled. The user preferably also need not be concerned about energy consumers which can be switched off in a break mode. These decisions are made in advance, for example by the manufacturer of the energy consumers who predefines the energy-saving functions and has created the corresponding program code parts in advance at a first, earlier time.

The same accordingly applies to the other energy-saving modes.

At the end of the programming operation at a second, later time, the PLC program code is assembled from program code parts selected by the user (block 208) and is then transmitted to the PLC 400 via the connection 300. During execution of the PLC user program on the PLC 400, the energy-saving functions selected by the user are performed according to the PLC user program (block 212).

The solution according to the disclosure makes it possible to incorporate energy-saving functions in PLC user program code without the user himself having to have knowledge of the special energy-saving function programming requirements of the individual energy consumers.

What is claimed is:

1. A method for programming a programmable logic controller configured to control a machine having energy consumers and energy-saving properties, comprising:

providing, at a first earlier time, a plurality of selectable program code parts for the programmable logic controller, at least one of the plurality of selectable program code parts being configured to activate at least one energy-saving function of the machine, at least one of the at least one energy-saving function being a break mode for operation of the machine with the at least one energy-saving function during only a portion of a predetermined break time, the portion of the predetermined break time being a part of the predetermined break time other than a predetermined time needed to restore a production mode of the machine from the energy-saving function and a total time period of the predetermined break time;

automatically generating user program code, at a second later time, by combining at least two of the plurality of selectable program code parts that have been selected by a user; and programming the programmable logic controller with the user program code, the programmable logic controller being configured to execute the user program code to control the machine.

2. The method according to claim 1, wherein the energy-saving properties are known at a programming time.

3. The method according to claim 1, wherein the energy-saving properties are taken from a device library file.

4. The method according to claim 1, wherein the energy-saving properties are input by the user.

5. The method according to claim 1, wherein the energy-saving properties are read out at a runtime of the user program code.

6. The method according to claim 1, wherein the energy-saving properties are read out during the programming.

7. The method according to claim 1, wherein at least one of the energy-saving properties is at least one of a power consumption in an energy-saving mode, an energy consumption for restoring the production mode, and an average power consumption in the production mode.

8. The method according to claim 1, wherein at least one of the energy-saving functions comprises a standby mode during a production mode.

9. The method according to claim 1, wherein the at least one of the plurality of selectable program code parts that is configured to activate the at least one energy-saving functions of the machine is provided as part of an operating mode.

10. The method according to claim 1, wherein at least one of the at least one energy-saving function comprises a maintenance mode.

11. The method according to claim 1, wherein the break mode is configured to receive the break time as an input from an operator of the machine.

12. The method according to claim 11, wherein the break mode is configured to commence only if the break time is greater than a minimum break time.

13. The method according to claim 11, wherein the break mode is configured to endure for less than the break time based on a lead time required for continuing a production mode upon the expiration of the break time.

* * * * *